United States Patent
Sase et al.

(10) Patent No.: US 9,074,505 B2
(45) Date of Patent: Jul. 7, 2015

(54) PM ACCUMULATION AMOUNT ESTIMATION DEVICE FOR DPF

(71) Applicant: MITSUBISHI HEAVY INDUSTRIES, LTD., Tokyo (JP)

(72) Inventors: Ryo Sase, Tokyo (JP); Ko Takayanagi, Tokyo (JP); Keisuke Okuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/347,570

(22) PCT Filed: Oct. 15, 2012

(86) PCT No.: PCT/JP2012/076589
§ 371 (c)(1),
(2) Date: Mar. 26, 2014

(87) PCT Pub. No.: WO2013/073326
PCT Pub. Date: May 23, 2013

(65) Prior Publication Data
US 2014/0238003 A1    Aug. 28, 2014

(30) Foreign Application Priority Data
Nov. 16, 2011    (JP) .................................. 2011-251049

(51) Int. Cl.
*F01N 3/00*     (2006.01)
*F01N 3/023*    (2006.01)
(Continued)

(52) U.S. Cl.
CPC ................ *F01N 3/023* (2013.01); *F01N 9/002* (2013.01); *F01N 9/005* (2013.01); *F01N 11/00* (2013.01);
(Continued)

(58) Field of Classification Search
CPC ..... F02D 41/029; F01N 9/002; F01N 3/0842; F01N 3/035; F01N 13/02
USPC ........................................... 60/295, 297, 311
See application file for complete search history.

(56) References Cited

U.S. PATENT DOCUMENTS

2004/0031262 A1*  2/2004  Gui et al. ........................ 60/285
2004/0194450 A1* 10/2004  Tanaka et al. ................... 60/285
(Continued)

FOREIGN PATENT DOCUMENTS

JP       07071228 A   *  3/1995  ............... F01N 3/02
JP       2002-97930 A     4/2002
(Continued)

OTHER PUBLICATIONS

International Preliminary Report on Patentability (Forms PCT/IB/338, PCT/IB/373, and PCT/ISA/237) for International Application No. PCT/JP2012/076589, dated May 20, 2014, with an English translation.
International Search Report and Written Opinion of the International Searching Authority (Forms PCT/ISA/210, PCT/ISA/220, and PCT/ISA/237) for International Application No. PCT/JP2012/076589, dated Jan. 8, 2013.

Primary Examiner — Thomas Denion
Assistant Examiner — Patrick Maines
(74) Attorney, Agent, or Firm — Birch, Stewart, Kolasch & Birch, LLP (57) ABSTRACT

A PM accumulation amount estimation unit 50 is provided with an exhaust amount computation unit 51 for computing PM exhaust amount which is discharged in an exhaust gas passage 3, and a passive regeneration amount computation unit 52 for computing a PM regeneration amount in a DPF 7, and is configured to estimate the PM accumulation amount in the DPF 7 from the difference between the PM exhaust amount computed by the exhaust amount computation unit 51 and the PM regeneration amount computed by the passive regeneration amount computation unit 52. The PM accumulation amount estimation unit 50 is further configured such that, when an abnormality is found in an airflow meter 31, the PM regeneration amount from $NO_2$ is computed, and the PM accumulation amount in the DPF is estimated, without using the airflow amount measured by the airflow meter 31.

5 Claims, 7 Drawing Sheets

(51) Int. Cl.
- *F01N 9/00* (2006.01)
- *F01N 11/00* (2006.01)
- *F02D 41/14* (2006.01)
- *F02D 41/18* (2006.01)
- *F02D 41/22* (2006.01)
- *F01N 13/00* (2010.01)

(52) U.S. Cl.
CPC ............ *F02D 41/1467* (2013.01); *F02D 41/18* (2013.01); *F02D 41/222* (2013.01); *F01N 2900/0416* (2013.01); *F01N 2900/0601* (2013.01); *F01N 2900/08* (2013.01); *F01N 2900/1402* (2013.01); *F01N 2900/1606* (2013.01); *F02D 2200/0406* (2013.01); *F02D 2200/0414* (2013.01); *F02D 2200/0812* (2013.01); *Y02T 10/40* (2013.01); *Y02T 10/47* (2013.01); *F01N 13/0097* (2014.06)

(56) References Cited

U.S. PATENT DOCUMENTS

2010/0031636 A1* 2/2010 Kiyofuji et al. ................. 60/285
2013/0186071 A1* 7/2013 Mori ............................... 60/274

FOREIGN PATENT DOCUMENTS

| JP | 2002-332823 A | | 11/2002 |
| JP | 2005-188409 A | | 7/2005 |
| JP | 2006-316746 A | | 11/2006 |
| JP | 2006316746 A | * | 11/2006 |
| JP | 2010116857 A | * | 5/2010 |
| JP | 2011-202573 A | | 10/2011 |
| JP | 2013231376 A | * | 11/2013 |

* cited by examiner

PM ACCUMULATION AMOUNT ESTIMATION DEVICE FOR DPF

TECHNICAL FIELD

The present invention relates to a PM accumulation amount estimation device for estimating an accumulation amount of PM (Particulate Matter, hereinafter simply referred to as PM) accumulated in a diesel particulate filter (hereinafter, simply referred to as DPF) for collecting the PM in the exhaust gas emitted from a diesel engine.

BACKGROUND ART

DPFs have been known as an effective technology for removing PM in exhaust gas from a diesel engine.

The DPF is a PM collecting device using a filter and is arranged in an exhaust path. The DPF is configured to collect PM such as soot exhausted from the engine by a filter and then remove PM from the exhaust gas. A part of the PM collected by the DPF is combusted by exhaust gas of high temperature exhausted from the engine (natural regeneration), and the rest of the collected PM accumulates in the DPF. When the accumulation of PM progresses excessively, PM collection performance declines and the engine output declines. Therefore, in DPFs, it is necessary to perform an active regeneration at an appropriate timing to actively burn the PM accumulated in the filter and regenerate the filter.

To determine an appropriate timing for performing the active regeneration, it is necessary to accurately estimate a PM accumulation amount of the filter. If the PM accumulation amount is underestimated, the active regeneration timing is delayed. This causes decline of the PM collection performance, decline of the engine output, and so on, and possibly causes damage to the DPF due to excessive temperature rise during the active regeneration. In contrast, if the PM accumulation amount is overestimated, the active regeneration is performed frequently and issues such as deterioration of fuel economy and oil dilution.

The formula for estimating the accumulation amount of PM accumulated in the filter of the DPF is typically represented by the following formula (1).

PM accumulation amount=PM emission amount−PM regeneration amount (1)

The PM emission amount here is an amount of PM contained in the exhaust gas exhausted from the engine. Further, the PM regeneration amount particularly is a passive regeneration amount, which is an amount of PM burned by the exhaust gas of high temperature exhausted from the engine during normal operation and not during the active regeneration.

The above PM emission amount is computed using a map having an engine rotation speed and a fuel injection amount as input data. On the other hand, the PM regeneration amount is computed based on measured values from a variety of sensors such as a temperature sensor, a pressure sensor, an airflow meter, in addition to the engine rotation speed and the fuel injection amount. Thus, if a sensor such as the airflow meter fails, it is difficult to estimate the PM regeneration amount.

Patent Reference 1 discloses a technology for avoiding excessive accumulation of PM in a filter when sensors necessary for estimating the PM regeneration amount, such as the airflow meter fails. According to Patent Reference 1, in such case, the PM accumulation amount is computed as PM accumulation amount≈PM emission amount without computing the PM regeneration amount according to the above formula (1) so as to prevent underestimation of the PM accumulation amount.

CITATION LIST

Patent Reference

[Patent Reference 1]
JP 2006-316746 A

SUMMARY

Technical Problem

However, when computing the PM accumulation amount as described in Patent Reference 1, the PM regeneration amount is completely disregarded and thus, the PM accumulation amount is overestimated. Therefore, the active regeneration of the DPF is performed more frequently, resulting in the issues such as deterioration of the fuel economy and the oil dilution. Further, the airflow meter (especially, a hot wire airflow meter) tends to fail from being dirty, and is likely to have an abnormality compared to other sensors.

In view of the above issues, it is an object of the present invention to provide a PM accumulation amount estimation device for estimating a PM accumulation amount with higher accuracy than a conventional device, even when an abnormality is found in an airflow meter.

Solution to Problem

The present invention has been made to solve the above issues of the related art and to achieve the above object.

A PM accumulation amount estimation device according to an aspect of the present invention comprises:

a diesel particulate filter (DPF) configured to collect exhaust gas particulate matter (PM) in exhaust gas exhausted to an exhaust path from an internal combustion engine;

a PM accumulation amount estimation unit configured to estimate a PM accumulation amount of PM accumulating in the DPF;

an emission amount computation unit configured to compute a PM emission amount of the PM exhausted to the exhaust path; and a passive regeneration amount computation unit configured to compute a PM regeneration amount of the PM passively regenerated in the DPF, and the PM accumulation amount estimation unit is configured to estimate the PM accumulation amount in the DPF based on a difference between the PM emission amount computed by the emission amount computation unit and the PM regeneration amount computed by the passive regeneration amount computation unit, the passive regeneration amount computation unit is configured to compute a passive regeneration amount of PM regenerated passively by adding a PM regeneration amount of PM regenerated by oxygen in the exhaust gas and a PM regeneration amount of PM regenerated by nitrogen dioxide in the exhaust gas, the PM regeneration amount by the nitrogen dioxide being computed based on data which is at least in part computed based on an airflow volume measured by an airflow meter provided in an air supply path for supplying air to the internal combustion engine, and when an abnormality is found in the airflow meter, the PM accumulation amount in the DPF is estimated by computing the PM regeneration amount by the nitrogen dioxide without using the airflow measured by the airflow meter.

In this aspect of the present invention, the passive regeneration amount is estimated separately as to the PM regeneration amount of PM regenerated by oxygen and the PM regeneration amount of PM regenerated by nitrogen dioxide. In this process, flow volume data of the exhaust gas which is used for computation of the PM regeneration amount by nitrogen dioxide is computed from the airflow volume measured by the airflow meter. In contrast, for computation of the PM regeneration amount by oxygen, the airflow volume measured by the airflow meter is not used. When an abnormality is found in the airflow volume measured by the airflow meter, the PM regeneration amount by nitrogen dioxide is computed without using the airflow measured by the airflow meter. Then, this PM regeneration amount by nitrogen dioxide which is calculated in the above manner is added to the PM regeneration amount by oxygen so as to compute (estimate) the PM accumulation amount in the DPF.

Therefore, in this PM accumulation amount estimation device for the DPF according to the present invention, computation of at least the PM regeneration amount of PM by oxygen continues even when an abnormality is found in the airflow meter. Thus, compared to the conventional case, the PM accumulation amount can be estimated accurately.

It is preferable in the present invention that, when an abnormality is found in the airflow meter, the PM accumulation amount in the DPF is estimated by computing an airflow volume using an alternative means to the airflow meter to compute the PM regeneration amount by the nitrogen dioxide.

In the above invention, the alternative means may be constituted by a pressure/temperature measuring unit and an airflow volume computation unit, the pressure/temperature measuring unit being configured to measure a pressure and a temperature at an air supply manifold part which is connected to an upstream side of the internal combustion engine, the airflow volume computation unit being configured to compute the airflow volume from the pressure and temperature measured by the pressure/temperature measuring unit. With this configuration, even when an abnormality is found in the airflow meter, the PM accumulation amount can be estimated even more accurately than the conventional case. Further, a temperature sensor, a pressure sensor, and the like for EGR control which are installed in the airflow manifold part can be used as the pressure/temperature measuring unit.

Further, in the above invention, the alternative means may be constituted by a rotation speed/injection amount measuring unit and an airflow volume computation unit, the rotation speed/injection amount measuring unit being configured to measure an engine rotation speed and a fuel injection amount of the internal combustion engine, the airflow volume computation unit being configured to compute the airflow volume from a map including a relationship between the engine rotation speed and the fuel injection amount. With this configuration, even when an abnormality is found in the airflow meter, the PM accumulation amount can be estimated even more accurately than the conventional case. Further, a variety of sensor installed for controlling the internal combustion engine can be used as the rotation speed/injection amount measuring unit.

Furthermore, in the above invention, when an abnormality is found in the airflow meter, the PM accumulation amount in the DPF is estimated by computing the PM regeneration amount by nitrogen oxide as zero.

Even when the PM regeneration amount by $NO_2$ is computed as zero, the passive regeneration amount computation unit of the present invention is configured to compute a PM passive regeneration amount by adding the PM regeneration amount by oxygen and the PM regeneration amount by nitrogen dioxide. Therefore, as the PM regeneration amount by oxygen is computed, it is possible to compute the PM passive regeneration amount even more accurately than the conventional case.

Advantageous Effects

According to the present invention, it is possible to provide a PM accumulation amount estimation device which is capable of, even when an abnormality is found in the airflow meter, estimating a PM accumulation amount in the DPF with higher accuracy than a conventional device and avoiding issues such as deterioration of fuel economy and oil dilution resulting from frequent active regeneration.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
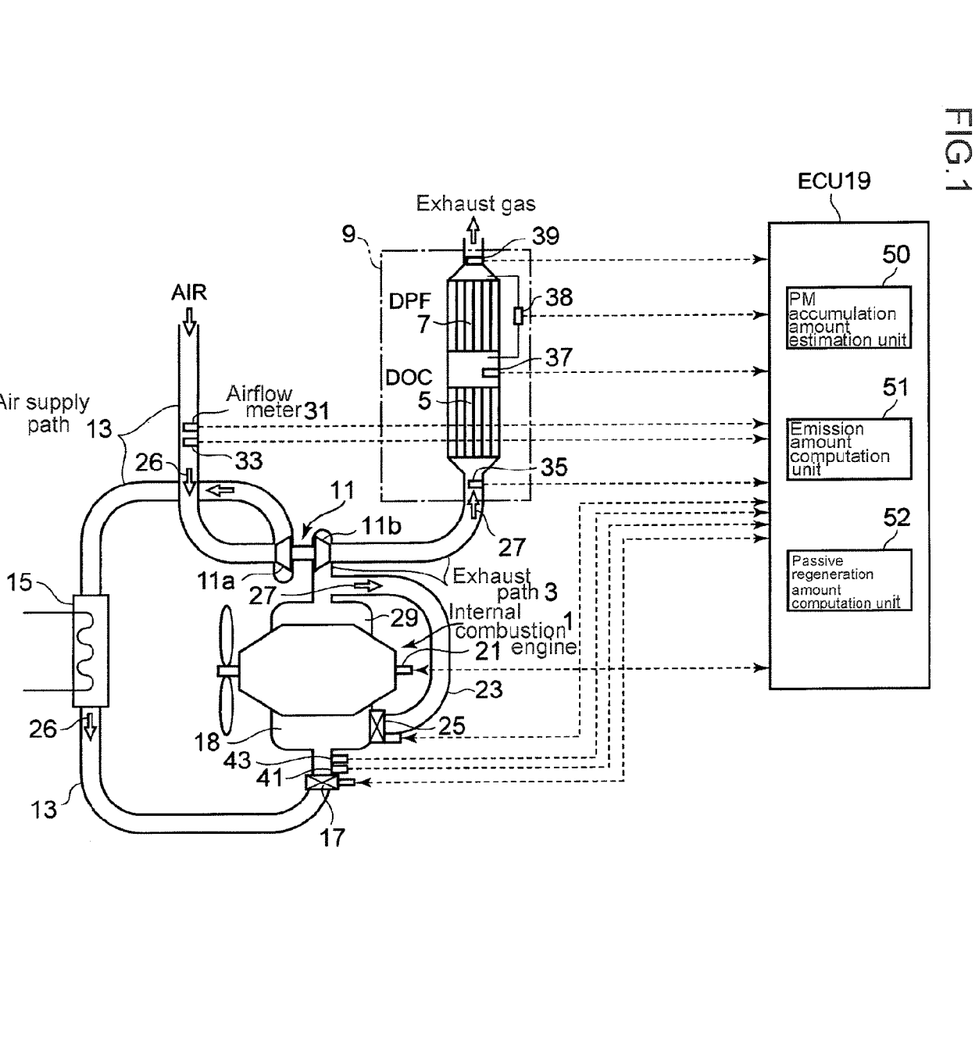
FIG. 1 is an illustration of an overall configuration of a diesel engine equipped with a DPF.

FIG. 1 is an illustration of an overall configuration of a diesel engine equipped with a DPF. In reference to FIG. 1, the overall configuration of the case where the PM accumulation amount estimation device of the present invention is applied to a diesel engine.

As illustrated in FIG. 1, an exhaust path 3 is connected to a downstream side of an internal combustion engine 1 of a diesel engine via an exhaust manifold 29. In the exhaust path 3, an exhaust gas after-treatment device 9 is provided. The exhaust gas after-treatment device 9 comprises a DOC (Diesel Oxidation Catalyst) 5 and a DPF arranged on a downstream side of the DOC 5. The DOC 5 has a function to oxidize and remove hydrocarbon (HC) and carbon monoxide (CO) in the exhaust gas and also to oxidize nitrogen monoxide (NO) in the exhaust gas so as to generate nitrogen dioxide ($NO_2$). The DPF 7, as described above, is configured to collect PM contained in the exhaust gas, such as soot, using a filter so as to remove PM from the exhaust gas.

An air supply path 13 is connected to an upstream side of the internal combustion engine 1 via an air supply manifold 18. An exhaust turbocharger 11 is provided between the air supply path 13 and the exhaust path 3. This exhaust turbocharger 11 comprises an exhaust turbine 11b arranged in the exhaust path 3 and a compressor 11a arranged in the air supply path 13. The compressor 11a is configured to be coaxially driven by the exhaust turbine 11b. In the air supply path 13, an intercooler 15 and an air supply throttle valve 17 are provided. The air 26 discharged from the compressor 11a is cooled by the intercooler 15 and then, an airflow volume of the air 26 is controlled by the air supply throttle valve 17. Then, the controlled air 26 enters a combustion chamber inside each cylinder of the internal combustion engine via the air supply manifold 18.

In the internal combustion engine 1, a common rail fuel injection unit (not shown) is provided. The common rail fuel injection unit is configured to inject fuel into the combustion chamber in the cylinder by controlling an injection volume and an injection timing of the fuel. An ECU 19 is configured to input a control signal to the common rail fuel injection unit so that a prescribed amount of fuel is supplied at a prescribed timing to a fuel injection valve from a common rail of the common rail fuel injection unit. A symbol 21 in the drawing indicates an input position of the control signal which is inputted to the common rail fuel injection unit from the ECU 19.

An EGR pipe 23 branches off from the exhaust path 3 at a position disposed immediately downstream from the exhaust manifold 29. The EGR pipe 23 is connected to the air supply manifold 18 disposed on a downstream side of the air supply throttle valve 17. Further, an EGR valve 25 is arranged in the EGR pipe 23. By controlling opening and closing of the EGR valve 25, a part of the exhaust gas 27 exhausted from the internal combustion engine 1 passes through the EGR pipe 23 to recirculate in the internal combustion engine 1.

The exhaust gas 27 exhausted from the internal combustion engine 1 passes through the exhaust manifold 29 and the exhaust path 3 and then drives the exhaust turbine 11b to coaxially drive the compressor 11a as described above. After passing through the exhaust path 3, the exhaust gas 27 flows to the DOC 5 and the DPF 7 of the exhaust gas after-treatment device 9.

An airflow meter 31 and an intake air temperature sensor 33 are arranged in the air supply path 13. The airflow meter 31 is configured to measure an airflow volume of the air flowing toward the compressor 11a. Then, signals as to the airflow volume measured by the airflow meter and the intake air temperature measured by the intake air temperature sensor 33 are inputted to the ECU 19.

A DOC inlet temperature sensor 35, a DPF inlet temperature sensor 37, a DPF differential pressure sensor 38 and a DPF outlet temperature sensor 39 are arranged in the exhaust path 3. Signals as to a DOC inlet temperature, a DPF inlet temperature, a DPF outlet temperature, etc. are inputted to the ECU 19.

An engine rotation speed and a fuel injection amount are computed in the ECU 19 based on the input signals from a variety of sensors such as a crank sensor, a cam sensor, an accelerator sensor and a throttle sensor.

Further, an air supply temperature sensor 41 and an air supply pressure sensor 43 are arranged on a downstream side of the air supply throttle valve 17. The air supply temperature sensor 41 and the air supply pressure sensor 43 are configured to measure a temperature and a pressure in the air supply manifold 18, respectively. Signals as to the air supply temperature measured by the air supply temperature sensor 31 and the air supply pressure measured by the air supply pressure sensor 43 are inputted to the ECU 19. An optimum EGR amount is computed in the ECU 19 based on these air supply temperature and air supply pressure, so as to control opening and closing of the EGR valve 25.

The ECU 19 is configured by a microcomputer which comprises a CPU, a RAM, a ROM and an I/O interface. The signals from these sensors are inputted to the CPU from via an I/O interface. The CPU is configured to execute various types of control according to control programs stored in the ROM. Further, as illustrated in FIG. 1, an accumulation amount estimation unit 50, an emission amount computation unit 51 and a passive regeneration amount computation unit 52 of the present invention are constituted by the ECU 19.

Figure 2:
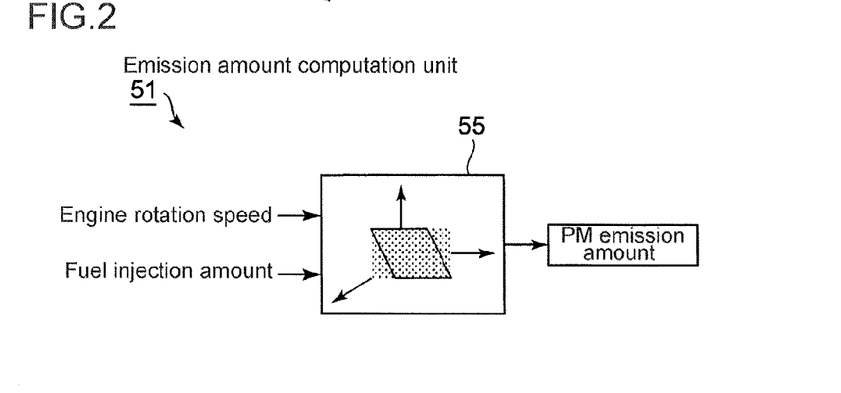
FIG. 2 is a block diagram illustrating an emission amount computation unit according an embodiment of the present invention.

The emission amount computation unit 51 is configured to compute a PM amount (a PM emission amount) of the PM contained in the exhaust gas exhausted from the internal combustion engine 1. The PM emission amount is computed by the emission amount computation unit 51, as illustrated in FIG. 2, using a PM emission amount map 55 having an engine rotation speed and a fuel injection amount as input data. This PM emission amount map 55 is produced by performing experiments and the like, and is stored in the ROM of the ECU 19 in advance.

Figure 3:
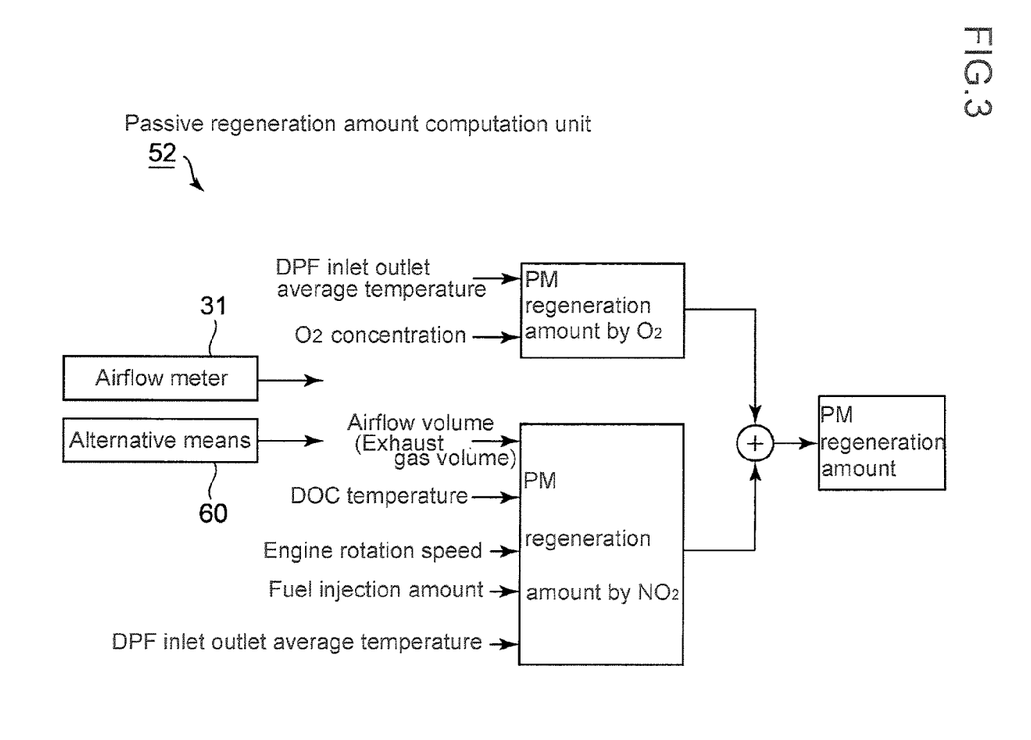
FIG. 3 is a block diagram illustrating a passive regeneration amount computation unit according to an embodiment of the present invention.

The passive regeneration amount computation unit 52 is configured to compute a passive regeneration amount, i.e. a PM amount (a PM regeneration amount) of the PM burnt by the high temperature exhaust gas exhausted from the internal combustion engine 1 during the normal operation instead of during active regeneration. This PM regeneration amount is, as illustrated in FIG. 3, computed by computing each of a PM regeneration amount of PM regenerated by oxygen ($O_2$) and a PM regeneration amount of PM regenerated by nitrogen dioxide ($NO_2$) and adding them together.

The PM regeneration amount of PM regenerated by oxygen is computed using an $O_2$ regeneration amount having the DPF inlet and outlet temperatures and oxygen concentration as input data. Meanwhile, the oxygen concentration may be measured by $O_2$ sensor or the like. In the present embodiment, however, the oxygen concentration is computed in the ECU 19 based on a pressure and a temperature of the exhaust gas, the fuel injection amount, an EGR circulation rate, and the like.

The PM regeneration amount of PM regenerated by nitrogen dioxide is computed using a $NO_2$ regeneration amount map having the DPF inlet and outlet average temperatures, an airflow volume (a volume of the exhaust gas), a DOC temperature, the engine rotation speed, the fuel injection amount, and DPF inlet and outlet temperatures as input data. Meanwhile, the volume of the exhaust gas is computed from the airflow volume measured by the above described airflow meter 31. Further, as described later, when an abnormality is found in the airflow meter 31, the airflow volume is computed using an alternative means 60 to the airflow meter 31.

The above $O_2$ regeneration amount map and $NO_2$ regeneration amount map are produced by performing experiments, etc. and are stored in the ROM of the ECU 19 in advance.

The PM accumulation amount estimation unit 51 is configured to compute (to estimate) the PM accumulation amount in the DPF based on the following formula (2) from a difference between the PM emission amount computed by the emission amount computation unit 51 and the PM regeneration amount computed by the passive regeneration amount computation unit 52.

$$PM \text{ accumulation amount} = PM \text{ emission amount} - \quad (2)$$
$$PM \text{ regeneration amount}$$
$$= PM \text{ emission amount} -$$
$$(PM \text{ regeneration amount by } O_2 +$$
$$PM \text{ regeneration amount by } NO_2)$$

First Embodiment

Figure 4:
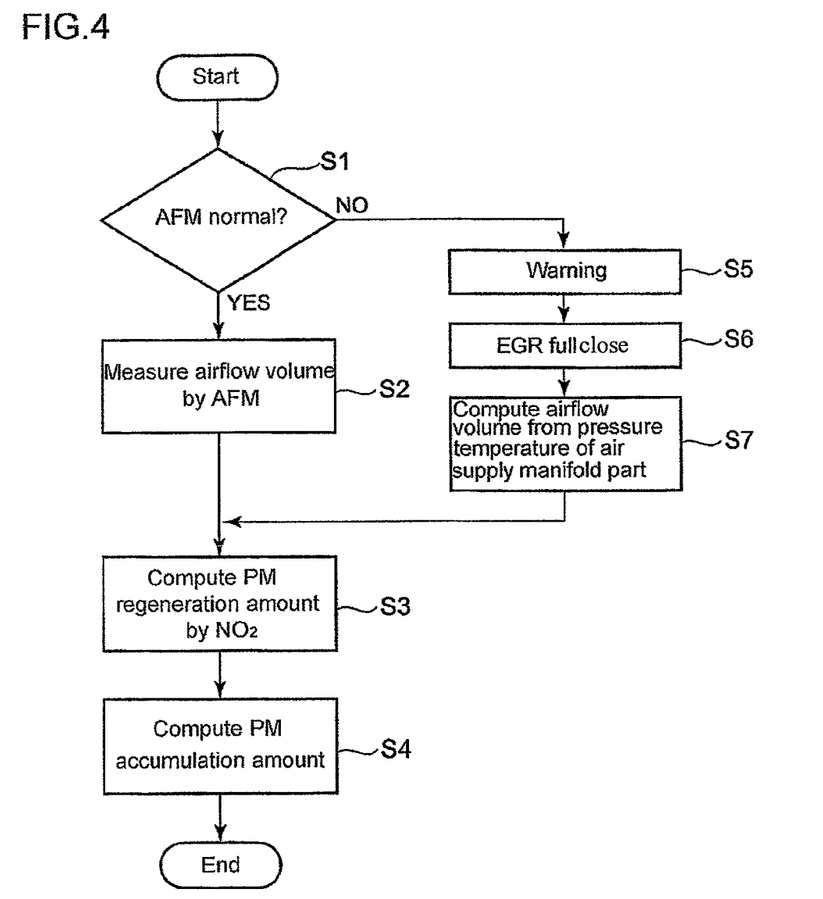
FIG. 4 is a flow chart illustrating a control flow of the passive regeneration amount computation unit according to a first embodiment.

A first embodiment of the PM accumulation amount estimation device with the above configuration equipped with the DPF 7 and PM accumulation amount estimation unit 50 is described below. FIG. 4 is a flow chart illustrating a control flow of the passive regeneration amount computation unit according to a first embodiment.

As illustrated in FIG. 4, after start, an abnormality of the airflow meter (AFM) is first determined (S1). Next, if the AFM is operating normally (YES in S1), the airflow volume is measured by the AFM (S2) and then the PM regeneration amount by $NO_2$ is computed (S3). Then, the PM regeneration amount by $O_2$ separately computed is added to the PM regeneration amount by $NO_2$ to compute the PM regeneration amount (S4).

In contrast, if the abnormality of the airflow meter (AFM) is determined (NO in S1), a warning is given to an operator, etc. (S5) and then the EGR valve 25 is fully closed (S6). Next, the airflow volume is computed in the ECU 19 (S7) using the following formulas (3), (4) which are stored in advance in the ROM, based on the temperature and pressure inside the air supply manifold 18 measured by the air supply temperature sensor 41 and the air supply pressure sensor 43. Then, flow volume data of the exhaust gas is computed from this airflow volume so as to compute the PM regeneration amount by $NO_2$ (S3).

$$G_{cyl} = (\rho \cdot V_{strk} N_e / 60) \cdot (2/I_{cyc}) \cdot N_{cyl} \cdot E_v \quad (3)$$

$$P = P/RT \quad (4)$$

Here, $G_{cyl}$ is an airflow volume, $\rho$ is a supply air density, P is an absolute pressure of the airflow manifold part, T is a temperature of the airflow manifold part, R is a gas state constant, $V_{strk}$ is a stroke volume per cylinder, $N_e$ is the engine rotation speed, $I_{cyc}$ is a stroke, $N_{cyl}$ is the number of cylinders, and $E_v$ is volume efficiency, and these are separately computed from maps.

Specifically, in the first embodiment, the alternative means 60 replaces the airflow meter to compute the airflow volume. The alternative means 60 is configured by the ECU 19 (the airflow volume computation unit) for computing the airflow volume from the pressure and temperature measured by the air supply temperature sensor 41 and the air supply pressure sensor 43 (pressure temperature measuring means) for measuring the pressure and temperature of the air supply manifold 18.

Figure 5:
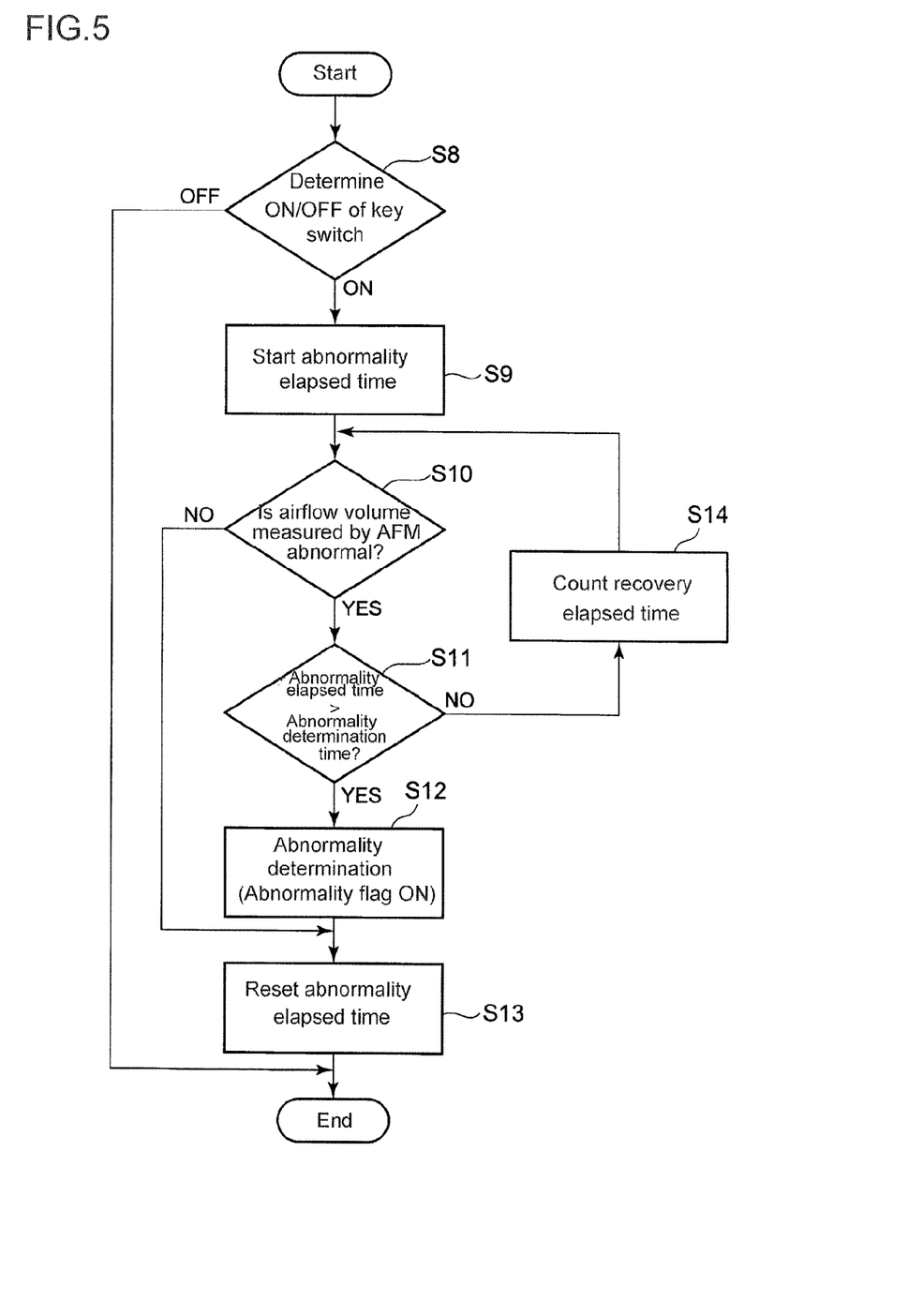
FIG. 5 is a flow chart illustrating an abnormality determination process of the airflow meter according to an embodiment of the present invention.
Figure 6:
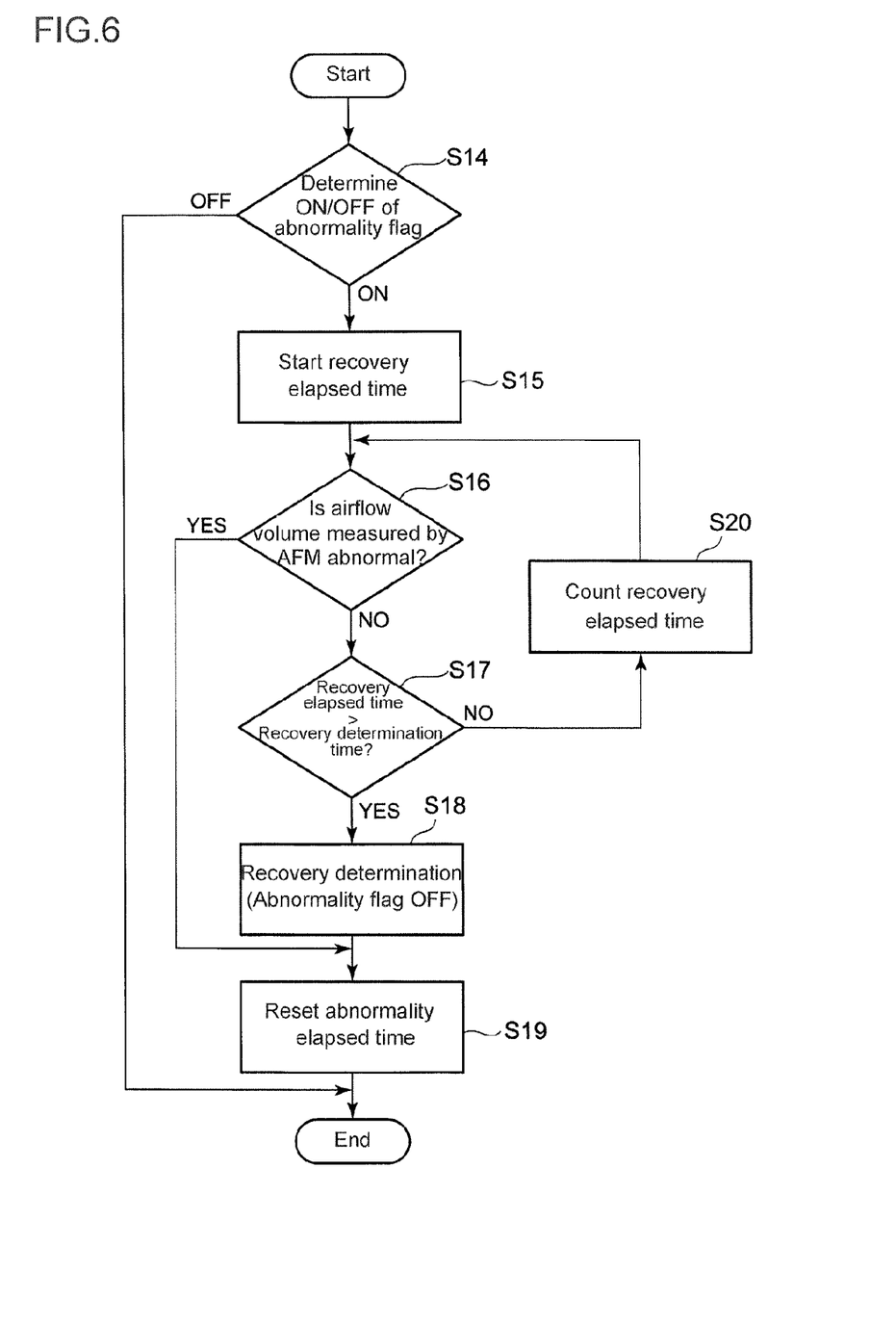
FIG. 6 is a flow chart illustrating a recovery determination process of the airflow meter according to an embodiment of the present invention.

Next, the process of determining the abnormality of the AFM (S1) illustrated in FIG. 4 is described in details in reference to FIG. 5 and FIG. 6. FIG. 5 is a flow chart illustrating an abnormality determination process of the airflow meter according to an embodiment of the present invention. FIG. 6 is a flow chart illustrating a recovery determination process of the airflow meter according to an embodiment of the present invention.

To determine abnormality of the AFM, as illustrated in FIG. 5, it is first determined whether an ignition switch is on or off (S8). If the ignition switch is ON, counting of an abnormality elapsed time starts (S9) and then, it is determined whether or not the airflow volume measured by the AFM is within a prescribed threshold range (S10). This threshold range can be set, for instance, by computing a range of the airflow volume during normal operation in correspondence to a prescribed engine rotation speed. If the airflow volume measured by the AFM is not within the prescribed threshold range (YES in S10), it is then determined whether or not the abnormality elapsed time exceeds a preset abnormality determination time (S11) and if YES, it is determined that the AFM has abnormality and an abnormality flag is set ON (S12) and then, the abnormality elapsed time is reset (S13). In contrast, if the airflow volume measured by the AFM is within the prescribed threshold range (NO in S10), the abnormality elapsed time is reset (S13). Further, if the abnormality elapsed time has not exceeded the preset abnormality determination time in S11, the abnormality elapsed time is counted (S14) and then the process repeats the step of determining the abnormality of the airflow volume measured by the AFM in S10 again.

To determine recovery of the AFM, as illustrated in FIG. 6, an ON/OFF state of the abnormality flag is determined (S14). If the abnormality flag is ON, counting of a recovery elapsed time starts (S15) and then, in the same manner as S10, it is determined whether or not the airflow volume measured by the AFM is within the prescribed threshold range (S16). Then, if the airflow volume measured by the AFM is within the prescribed threshold range (NO in S16), it is then determined whether or not the recovery elapsed time exceeds a preset recovery determination time (S17) and if YES, it is determined that the AFM has recovered from the abnormal state and an abnormality flag is set OFF (S18) and then the abnormality elapsed time is reset (S19). In contrast, if the recovery elapsed time has not exceeded the preset recovery determination time in S17, the recovery elapsed time is counted (S20) and then the process repeats the step of determining the abnormality of the airflow volume measured by the AFM in S16 again.

In this PM accumulation amount estimation device for the DPF according to the present invention, computation of the PM regeneration amount continues even when an abnormality is found in the airflow meter 31. Thus, compared to the conventional case, the PM accumulation amount can be estimated accurately. Further, the air supply temperature sensor 41 and the air supply pressure sensor 43 for EGR control can be used as the pressure/temperature measuring means of the alternative means 60. Thus, the alternative means 60 can be configured without additionally providing sensors

Second Embodiment

Figure 7A:
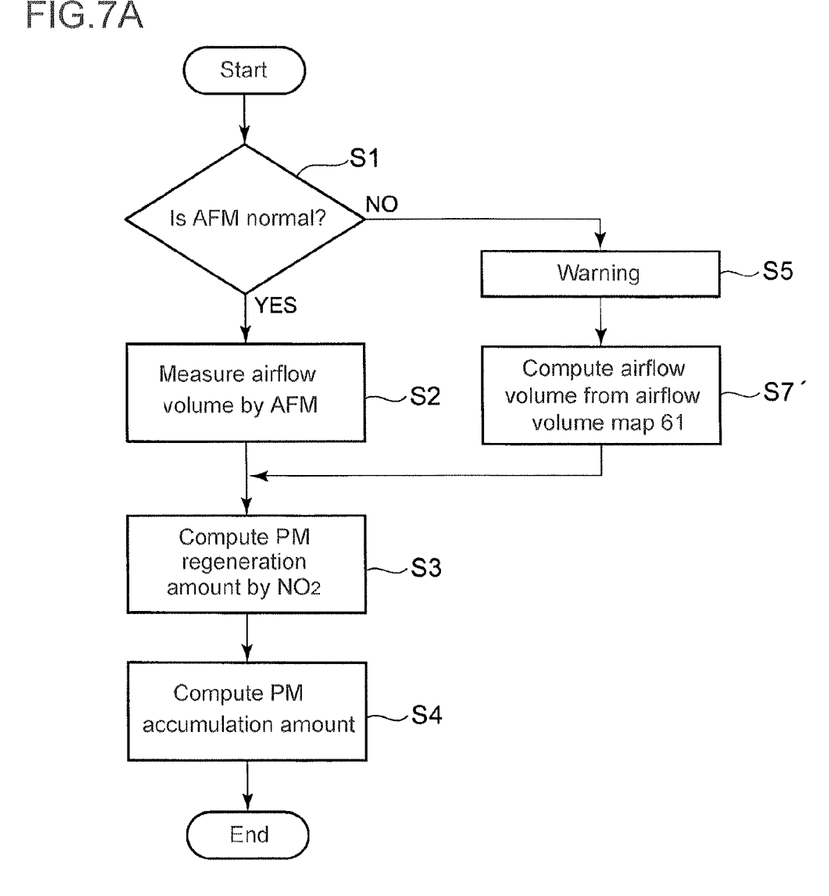
FIG. 7A is a flow chart illustrating a control flow according to a second embodiment.

A second embodiment of the PM accumulation amount estimation device of the present invention for the DPF is described below. FIG. 7 is a flow chart illustrating a control flow of a passive regeneration amount computation unit according to the second embodiment. This control flow of the second embodiment illustrated in FIG. 7 has basically the same configuration as the control flow of the first embodiment, and the same reference numerals are given without adding explanations for the steps that are the same as the first embodiment.

Figure 7B:
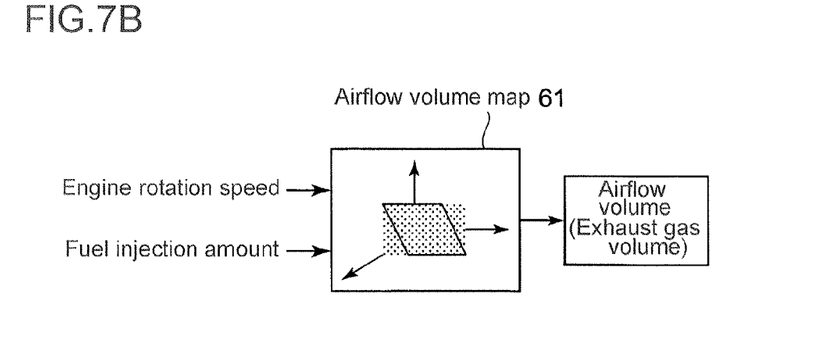
FIG. 7B is a block diagram illustrating an airflow volume map 61 according an embodiment of the present invention.

As illustrated in FIG. 7A, the second embodiment is different from the first embodiment in that when the abnormality is found in the AFM (NO in S1), the airflow volume is computed by an airflow volume map 61 (S7') instead of computing the airflow volume from the pressure and temperature of the airflow manifold (S7). The airflow volume map 61 is a map having the engine rotation speed and the fuel injection amount as input data as illustrated in FIG. 7B.

The engine rotation speed and the fuel injection amount are, as described above, computed in the ECU 19 based on input signals from a variety of sensors such as a crank sensor, a cam sensor, an accelerator sensor and a throttle sensor. Further, this airflow volume map 61 is produced by performing experiments, etc. and is stored in the ROM of the ECU 19 in advance.

Specifically, in the second embodiment, the alternative means 60 replaces the airflow meter to compute the airflow volume. The alternative means 60 is configured by an ECU 19 (a rotation speed/injection amount measuring unit) and a variety of sensors for computing the engine rotation speed and the fuel injection amount, and the ECU 19 (the airflow volume computation unit) for computing the airflow volume from the airflow volume map 61 and these engine rotation speed and fuel injection amount.

Figure 8:
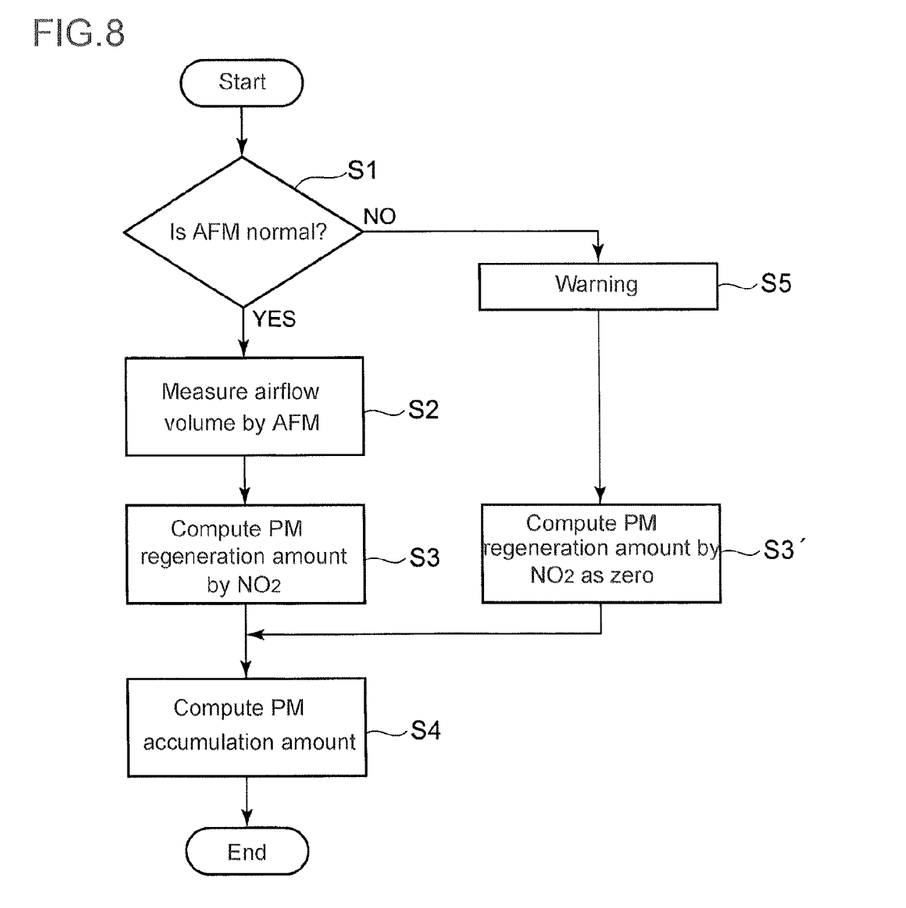
FIG. 8 is a flow chart illustrating a control flow according to a third embodiment.

In this PM accumulation amount estimation device for the DPF according to the present invention is configured to continue computing the PM regeneration amount even when an abnormality is found in the airflow meter 31. Thus, compared to the conventional case, the PM accumulation amount can be estimated accurately. Further, the sensors and the like for controlling the internal combustion engine 1 can be used as the rotation speed/injection amount measuring unit of the alternative means 60. Thus, the alternative means 60 can be configured without additionally providing sensors Third Embodiment A third embodiment of the PM accumulation amount estimation device of the present invention for the DPF is described below. FIG. 8 is a flow chart illustrating a control flow of a passive regeneration amount computation unit according to the third embodiment. This control flow of the third embodiment illustrated in FIG. 8 has basically the same configuration as the control flow of the first embodiment, and the same reference numerals are given without adding explanations for the steps that are the same as the first embodiment.

As illustrated in FIG. 8, the third embodiment is different from the first embodiment in that when the abnormality is found in the AFM (NO in S1), the PM regeneration amount by $NO_2$ is set as zero (S3'), instead of computing the airflow volume from the pressure and temperature of the airflow manifold (S7) to compute the PM regeneration amount by $NO_2$ (S3).

Specifically, the PM accumulation amount is estimated based on the following formula (2') stating that the PM regeneration amount by $NO_2$ is zero and the PM regeneration amount≈the PM regeneration amount by $O_2$ in the above-described formula (2).

$$PM \text{ accumulation amount} = PM \text{ emission amount} - PM \text{ regeneration amount} \quad (2')$$

$$= PM \text{ emission amount} - PM \text{ regeneration amount by } O_2$$

Even when the PM regeneration amount by $NO_2$ is computed as zero, the passive regeneration amount computation unit of the present invention is configured to compute a PM passive regeneration amount of the PM regenerated passively by adding the PM regeneration amount by $O_2$ and the PM regeneration amount by $NO_2$. Therefore, the PM regeneration amount by $O_2$ is taken into account as the PM regeneration amount. As a result, compared to the conventional case, it is possible to compute the PM passive regeneration amount accurately in this situation.

While the embodiments of the present invention have been described, it is obvious to those skilled in the art that various changes may be made without departing from the scope of the invention.

According to the present invention, the PM accumulation amount estimation device of the present invention is preferably usable as a PM accumulation amount estimation device which is capable of accurately estimating the PM accumulation amount of the PM accumulated in the DPF.

The invention claimed is:

1. A PM accumulation amount estimation device comprising:
   a diesel particulate filter (DPF) configured to collect exhaust gas particulate matter (PM) in exhaust gas exhausted to an exhaust path from an internal combustion engine;
   an airflow meter configured to measure airflow volume; and
   a control unit including a processor that executes instructions to:
   estimate a PM accumulation amount of PM accumulating in the DPF;
   compute a PM emission amount of the PM exhausted to the exhaust path; and
   compute a PM regeneration amount of the PM passively regenerated in the DPF,
   wherein the processor further executes instructions to:
   estimate the PM accumulation amount in the DPF based on a difference between the computed PM emission amount and the computed PM regeneration amount,
   compute a passive regeneration amount of PM regenerated passively by adding a PM regeneration amount of PM regenerated by oxygen in the exhaust gas and a PM regeneration amount of PM regenerated by nitrogen dioxide in the exhaust gas, the PM regeneration amount by the nitrogen dioxide being computed based on data which is at least in part computed based on an airflow volume measured by an airflow meter provided in an air supply path for supplying air to the internal combustion engine, and
   wherein when an abnormality is found in the airflow meter, the PM accumulation amount in the DPF is estimated by computing the PM regeneration amount by the nitrogen dioxide without using the airflow volume measured by the airflow meter.

2. The PM accumulation amount estimation device according to claim 1,
   wherein when an abnormality is found in the airflow meter, the PM accumulation amount in the DPF is estimated by computing an airflow volume using an alternative means to the airflow meter to compute the PM regeneration amount by the nitrogen dioxide.

3. The PM accumulation amount estimation device according to claim 2,
wherein the airflow volume is computed by the alternative means based on a pressure and a temperature at an air supply manifold part which is connected to an upstream side of the internal combustion engine, and the processor further executes instructions to compute the airflow volume from the measured pressure and temperature.

4. The PM accumulation amount estimation device according to claim 2,
wherein the airflow volume is computed based by the alternative means based on an engine rotation speed and a fuel injection amount of the internal combustion engine, and the processor further executes instructions to compute the airflow volume from a map including a relationship between the engine rotation speed and the fuel injection amount.

5. The PM accumulation amount estimation device according to claim 1,
wherein when an abnormality is found in the airflow meter, the PM accumulation amount in the DPF is estimated by computing the PM regeneration amount by the nitrogen oxide as zero.

* * * * *